Nov. 24, 1970     G. S. ANDERSSON     3,541,658
METHOD AND APPARATUS FOR FASTENING A TUBE INTO A TUBE GABLE
Filed June 21, 1968
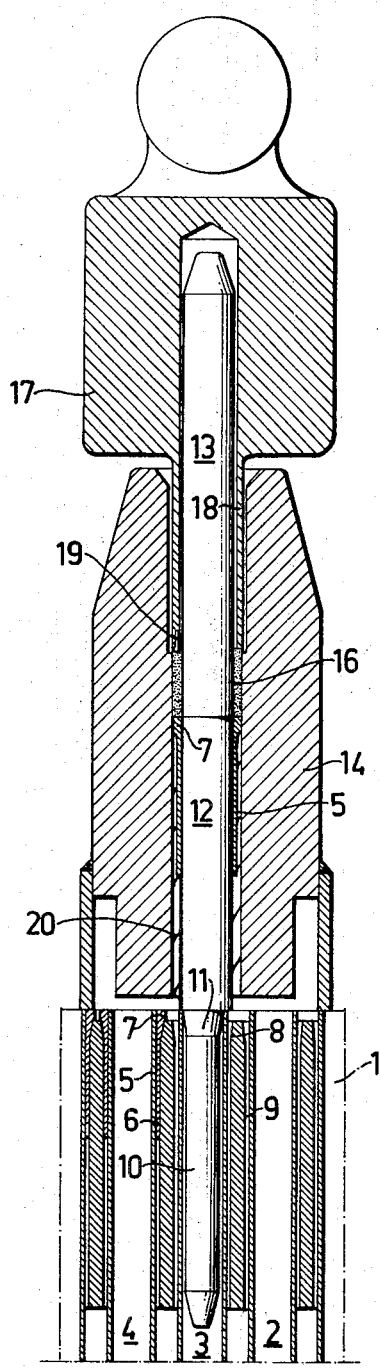

— # United States Patent Office 3,541,658
Patented Nov. 24, 1970

3,541,658
METHOD AND APPARATUS FOR FASTENING A TUBE INTO A TUBE GABLE
Gustav Sigfrid Andersson, Grevgatan 36,
Stockholm, Sweden
Filed June 21, 1968, Ser. No. 739,110
Int. Cl. B21d *53/02*
U.S. Cl. 29—157.4     5 Claims

ABSTRACT OF THE DISCLOSURE

In boilers, heat exchangers, and other apparatuses containing a large number of tubes having their ends fastened to walls (referred to hereinbelow as tube gables) the tubes may be firmly fastened to the walls by means of a charge of powder. The tube is inserted into a somewhat larger opening in the wall, and a tubular socket is now driven at high speed into the annular space between the tube and the wall by means of a charge of powder.

---

The invention relates to a method and an apparatus for fastening a tube into a tube gable. The conventional method is to fasten the tube into the gable by means of a rolling operation, whereby the limit of elasticity of the tubing material is exceeded. The invention is designed to secure a tight fit without exceeding the limit of elasticity. The invention is partcularly intended to be used with tubes of steel alloy which can not withstand a substantial plastic deformation.

The method according to the invention is characterized by the insertion of the tube into a somewhat larger opening in the tube gable, after which a tubular socket is driven at high speed into the circular space between the tube and the tube gable by means of a charge of powder. The socket is driven in from the outside of the tube gable, and the force of the drive is adjusted so that the yield point of the tubing material is not exceeded, or is exceeded only negligibly.

The high speed of the socket attained by means of the charge of powder seems to cause surface welding between the surface of the socket and the surfaces of the tube and the passage in the tube gable. The welding effect contributes to making a tight fit. Surface welding becomes more pronounced if the socket is rotated while being driven. A probable explanation for this is that the socket obtains maximum kinetic energy, i.e. both a rotating motion and a straight line motion, and maximum heat is generated when the motion of the socket is checked.

The following is an explanation of the invention with the attached drawing illustrating the fastening of tubes in a tube gable using a charge of powder. The drawing shows a tube gable 1 with passages in which the ends of three tubes 2–4 are inserted. The ends of the three tubes 2–4 have a somewhat smaller diameter than the passages, thus leaving a gap 9 between the tube and the sides of the passage. The upper part of the passages are tapered to form a conical enlargment 8. The tube 4 is shown fastened in the tube gable by means of a socket 5 which has a conical enlargement at its upper end 6 corresponding to the beveled section of the tube passages, and a flange 7 which is contiguous to the upper section of the tube gable.

The mounting of the socket is shown with reference to tube 3. Down into tube 3 is inserted a mandrel which consists of a lower slender portion 10, a middle portion 12 with a somewhat larger diameter and an upper portion 13 with an even larger diameter. Between sections 10 and 12 there is a conical piece 11 which acts as a steering mechanism in the tube. The mandrel rests on the tube by the lower edge of its middle section 12 which has a diameter equal to or slightly larger than the outer diameter of the tube.

A socket 5 is mounted on the middle section 12 of the mandrel. An annular charge of powder 16 is placed above the socket on the uppermost section 13 of the mandrel. The mandrel, with socket and charge of powder, is encased in a gun barrel 14 which, at its lower end, is provided with a cylindrical collar 15, the lower edge of which rests on the upper ends of the tubes. The bore of the gun barrel is provided with spiral grooves 20 that operate in conjunction with the flange 7 of the socket. On the upper section of the mandrel a relatively heavy rifle bolt 17 is mounted. The slender cylindrical section 18 of the rifle bolt sticks down into the gun barrel 14 coming into contact with the charge of powder. There is a priming mechanism 19 for the charge of powder at the lower end of the cylindrical section 18.

When the charge of powder is ignited, the powder gases drive the socket 5 downwards at high speed and, at the same time, the socket rotates along the grooves 20. The weight of the charge of powder is adjusted so that the socket is driven into the opening 9 to its full length, i.e. until the flange 7 comes into contact with the tube gable. The tapering 8 of the upper section of the tube passage makes the driving of the socket into the opening easier since the tube doesn't have to be exactly centered at the opening. The powder gas exerts an upward pressure on the narrow shoulder between sections 12 and 13 of the mandrel, which makes it easier to lift the mandrel out of the tube.

What is claimed is:
1. Method for fastening a metal tube into a tube gable which comprises inserting the tube into a somewhat larger opening in the tube gable and driving a tubular-shaped socket at high speed into the annular space between the tube and the tube gable by means of an explosive charge.
2. Method according to claim 1, characterized in that the socket is rotated while being driven into said annular space.
3. Apparatus for driving a tubular-shaped socket (5) between a metal tube (3) and a tube gable (1) in order to fasten the tube in the tube gable, which comprises a mandrel (10–13), the front end of which is inserted into the tube (3); a gun barrel (14) having a bore which is so much larger than the mandrel that the socket and an explosive charge (16) can be placed in the space between the gun barrel and the mandrel; and a rifle bolt (17) for closing the back opening of the bore.
4. Apparatus according to claim 3, characterized in that the rifle bolt (17) encloses the rear portion (13) of the mandrel and has a cylindrical portion (18) which projects into the gun barrel.
5. Apparatus according to claim 3, characterized in that the bore of the gun barrel is provided with spiral grooves (20).

References Cited
UNITED STATES PATENTS 1,192,927   8/1916   Mosher _____ 29—157.4 X
2,141,098  12/1938   Wahlstrom _____ 29—421 X
2,521,186   9/1950   Pennella.

JOHN F. CAMPBELL, Primary Examiner
D. C. REILEY, Assistant Examiner

U.S. Cl. X.R.
29—421, 470.1, 526; 228—3